Nov. 24, 1925.

C. A. TOWE 1,562,928

WHEEL

Filed Aug. 11, 1924

INVENTOR.
Claude. A. Towe
BY Gerald S. Baldwin
ATTORNEY.

Nov. 24, 1925.    1,562,928
C. A. TOWE
WHEEL
Filed Aug. 11, 1924    2 Sheets-Sheet 2
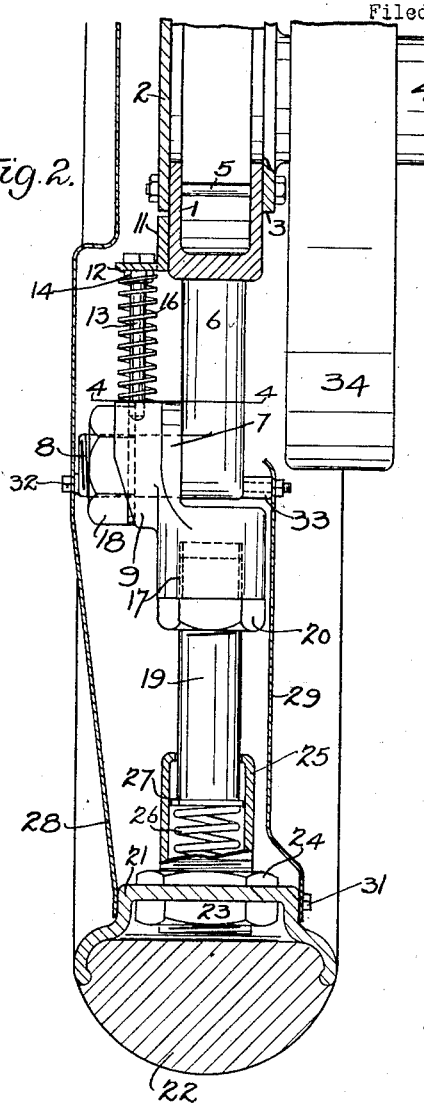
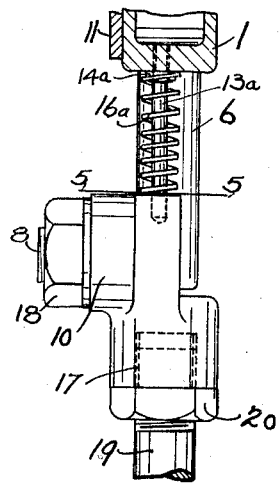
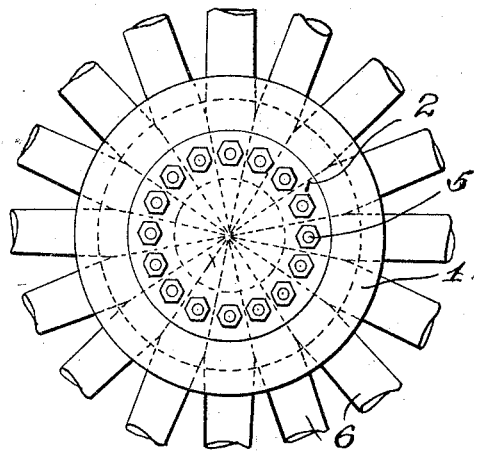
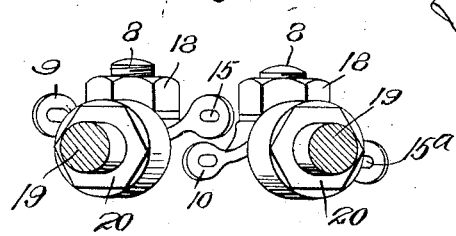
INVENTOR.
Claude A. Towe.
BY
Gerald L. Baldwin
ATTORNEY.

Patented Nov. 24, 1925.

1,562,928

UNITED STATES PATENT OFFICE.

CLAUDE A. TOWE, OF DETROIT, MICHIGAN.

WHEEL.

Application filed August 11, 1924. Serial No. 731,301.

*To all whom it may concern:*

Be it known that I, CLAUDE A. TOWE, a citizen of the United States, residing at Detroit, in the county of Wayne and State of Michigan, have invented a new and useful Improvement in Wheels, of which the following is a specification.

My invention relates to improvements in wheels, and refers more particularly to spring wheels. One of the objects of the invention is to supply a wheel that will protect the axle and any mechanism attached thereto from the severe shocks it now sustains when the usual rigid wheels are employed. Another object of the invention is to provide a wheel which is so resilient within itself that comfortable riding may be enjoyed with the use of solid tyres.

With these and other objects in view, my invention consists in certain novel construction and combination of parts hereinafter more fully described with the aid of the accompaying drawings and claims.

Figure 2 is a cross section of approximately half the wheel showing a fulcrum block with forwardly inclined sides and omitting the overlapping block and spring.

Figure 3 is a partial view showing a fulcrum block having rearwardly inclined sides, an inner member, part of an outer member, and with part of the hub in section.

Figure 6 is a detail showing one method of inserting the inner members when the latter are not made integral with the hub.

Figure 7 is a circumferential section on the line 7—7 of Figure 1.

Referring more particularly to the drawings, 1 indicates the hub of the wheel, which I supply with means for fastening to the axle 4, as by the plate 2 adapted to be secured to the plate 3 integral with the axle by means of bolts 5.

Figure 1:
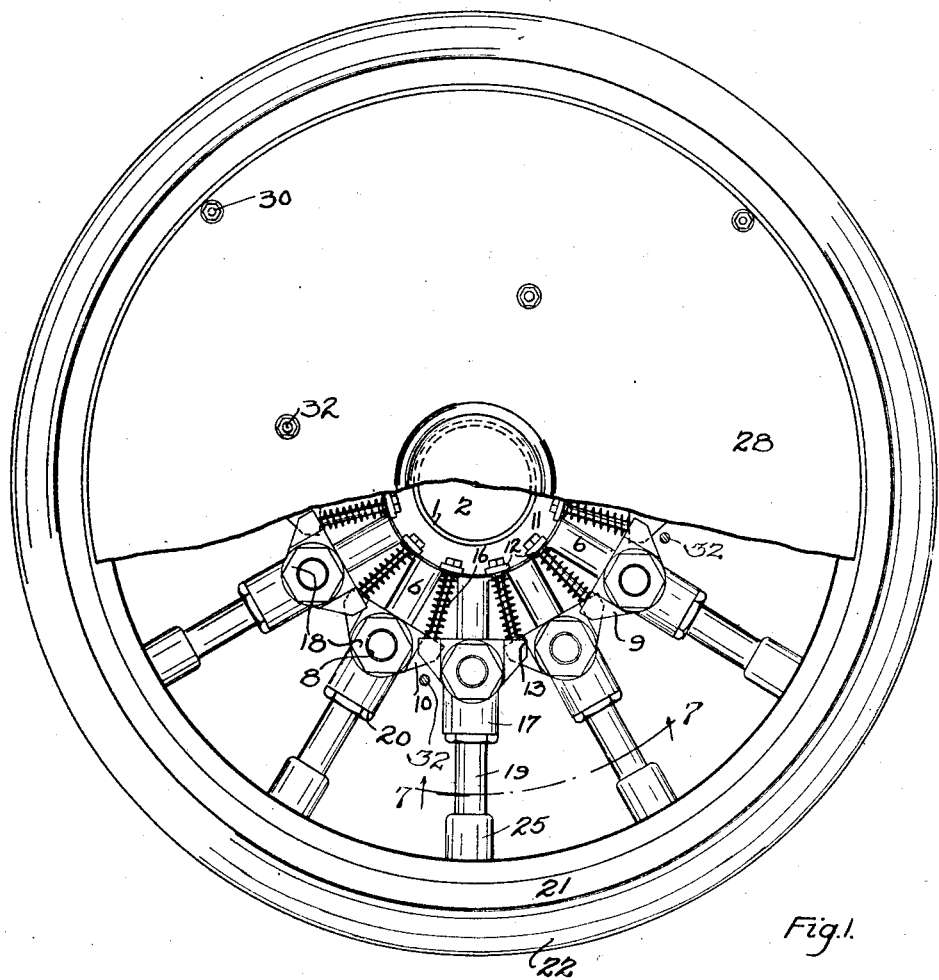
Figure 1 illustrates a front elevation of the wheel with part of the front casing broken away.
Figure 4:
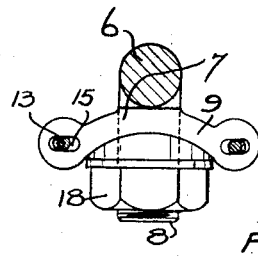
Figure 4 is a section on the line 4—4 of Figure 2.
Figure 5:
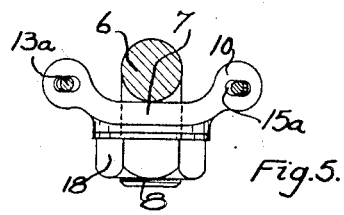
Figure 5 is a section on the line 5—5 of Figure 3.

Integral with, or secured to, the hub 1 are inner members 6 which terminate in forwardly disposed portions 7 and have threaded ends 8. A method I frequently employ for connecting the inner members 6 with the hub 1 is shown in Figure 6, wherein the inner ends of said inner members are bevelled so as to fit against the sides of the two adjacent members, and each inner member is held in place by a bolt 5. Each alternate portion 7 is mounted in a fulcrum block 9 having forwardly inclined sides as shown in Figures 1, 2, and 4; and the remaining portions 7 are mounted in fulcrum blocks 10 having rearwardly inclined sides, as shown in Figures 1, 3, and 5. In either case the portions 7 are held in place by means of nuts 18 screwed onto the threaded ends 8.

The object of supplying two different forms of fulcrum blocks is on account of the fact that they are near enough to the centre of the wheel for their sides to overlap, and it is necessary that they should clear each other if each block is to be permitted free and independent movement as intended.

On the face of the hub 1, I attach an annular plate 11 provided with lugs 12 through which pins 13 pass. These pins must be prevented from moving as the wheel rotates as by the lock nuts 14. The outer ends of the pins 13 rest in slotted holes 15 on the inner sides of the blocks 9, so that their outer ends are permitted lateral movement. Springs 16 arranged round the pins 13 are placed between the outer sides of the lugs 12 and the inner faces of the blocks 9.

Projecting outwardly from the hub 1, I supply studs $13^a$ which are prevented from loosening by the lock nuts $14^a$; the outer ends of the studs rest in slotted holes $15^a$ in the inner face of the rearwardly inclined sides of the fulcrum blocks 10, and springs $16^a$ are arranged round the said studs.

From Figure 1 it would appear that there are springs only between the lugs 12 and the inner faces of the outwardly inclined sides of the blocks 9. This is on account of the fact that the studs $13^a$ and the springs $16^a$, shown in Figure 3, are immediately behind the pins 13 and springs 16 and therefore do not show in Figure 1.

The outer ends, by which I mean the ends nearest to the outer circumference of the wheel, of the fulcrum blocks 9 and 10 are similar in construction; they each have threaded sockets 17 adapted to receive the threaded ends of the outer members 19, which I prefer to secure by lock nuts 20. It will be noted that in this way I bring the outer members into alignment with the inner members 6, and also provide adjustment as to length for the outer members.

On the wheel rim 21, which may be of any desired pattern to receive a suitable tyre 22, and preferably from the outer side of its circumference, I attach guides 25 by nuts 23 reinforced by lock nuts 24 on the inner circumference of the rim. The guides have openings at their inner ends of sufficient diameter to receive the outer ends of the outer members. The latter are supported within the guides by means of springs 26 which extend between the inner periphery of the wheel rim 21 and the outer side of the washers 27, against which the outer ends of the members 19 rest.

The inner and outer casings 28 and 29, which are secured around the rim of the wheel by external bolts 30 and internal bolts 31, are also tied to each other by bolts 32. Around the latter I prefer to place spacers 33 to hold the two casings in spaced relation to each other, particularly when the inner casing terminates approximately at the outer edge of the brake drum 34 as shown in Figure 2.

The rim may be of any desired cross section to suit the form of tyre to be used, and of such construction as to afford easy means for putting on and removing tyres. The hub construction may also be of any preferred pattern to suit the axle to which it is to be attached.

While in the foregoing I have shown and described the preferred embodiment of my invention, I may change the construction thereof provided the said changes fall within the scope of the claims.

What I claim as my invention and desire to secure by Letters Patent is:—

1. A wheel comprising a hub, inner members radiating therefrom, fulcrum blocks pivotally mounted on said inner members, and outer members secured to said fulcrum blocks, half of said fulcrum blocks having inwardly inclined sides and half of said fulcrum blocks having outwardly inclined sides, said inwardly and outwardly inclined sides being arranged to overlap one another, in combination with a rim, and guides secured to the inner circumference of said rim having springs therein, wherein said outer members terminate.

2. A wheel comprising a hub, an annular plate on said hub having a series of forwardly inclined circumferential lugs, fulcrum blocks having holes in their inner faces, inner members on which said fulcrum blocks are pivotally mounted, said inner members radiating from said hub, pins extending from said lugs into said holes, and springs around said pins, in combination with outer members attached to said blocks and a rim.

3. A wheel comprising a hub having studs radiating therefrom, fulcrum blocks having holes in which said studs terminate, arranged in their inner faces, inner members extending outwardly from said hub and having said fulcrum blocks pivotally mounted thereon at right angles to the radial direction of said members, and springs around said studs, in combination with outer members attached to said blocks and a rim.

4. A wheel comprising a hub having radiating inner members with forwardly projecting threaded ends substantially at right angles to their length fulcrum blocks mounted pivotally on said threaded ends and one spring exerting an outward tension arranged between said hub and each side of the inner face of each of said blocks, in combination with outer members secured to said blocks and a wheel rim.

5. A wheel comprising a hub having radiating inner members with forwardly projesting threaded ends substantially at right-angles to their length fulcrum blocks pivotally mounted thereon, and outer members in alignment with said inner members and adjustable as to their length secured to said blocks, said outer members terminating in guides attached on the inner circumference of a rim and cushioned by coil springs arranged between the ends of said outer members and said rim.

6. A wheel comprising a hub, inner members radiating therefrom, fulcrum blocks each overlapping the fulcrum block on each side of it and pivotally mounted on said inner members, and outer members so secured to said blocks as to be adjustable as to their length, and guides secured to the inner circumference of a rim, said guides having springs therein, against the inner ends of which the outer ends of said outer members rest.

CLAUDE A. TOWE.